United States Patent
Daly, Jr. et al.

(10) Patent No.: US 7,243,194 B2
(45) Date of Patent: Jul. 10, 2007

(54) METHOD TO PRESERVE ORDERING OF READ AND WRITE OPERATIONS IN A DMA SYSTEM BY DELAYING READ ACCESS

(75) Inventors: George William Daly, Jr., Austin, TX (US); James Stephen Fields, Jr., Austin, TX (US); Paul K. Umbarger, Austin, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/054,403

(22) Filed: Feb. 9, 2005

(65) Prior Publication Data

US 2006/0179185 A1   Aug. 10, 2006

(51) Int. Cl.
*G06F 12/00* (2006.01)
(52) U.S. Cl. .......................................... 711/158; 710/40
(58) Field of Classification Search ................ 711/158; 710/40
See application file for complete search history.

(56) References Cited

U.S. PATENT DOCUMENTS

| | | | |
|---|---|---|---|
| 6,738,874 B2 * | 5/2004 | Zsohar | 711/157 |
| 6,842,830 B2 * | 1/2005 | Khare et al. | 711/150 |
| 6,957,311 B2 * | 10/2005 | Kanamaru et al. | 711/158 |
| 7,047,374 B2 * | 5/2006 | Sah et al. | 711/158 |

* cited by examiner

*Primary Examiner*—Hiep T. Nguyen
(74) *Attorney, Agent, or Firm*—Diana R. Gerhardt; Dillon & Yudell LLP

(57) ABSTRACT

A method, system and computer program product for handling write requests in a data processing system is disclosed. The method comprises receiving on an interconnect bus a first write request targeted to a first address and receiving on the interconnect bus a subsequent second write request targeted to a subsequent second address. The subsequent second write request is completed prior to completing the first write request, and, responsive to receiving a read request targeting the second address before the first write request has completed, data associated with the second address of the second write request is supplied only after the first write request completes.

20 Claims, 5 Drawing Sheets

METHOD TO PRESERVE ORDERING OF READ AND WRITE OPERATIONS IN A DMA SYSTEM BY DELAYING READ ACCESS

BACKGROUND OF THE INVENTION

1. Technical Field

The present invention relates in general to data processing systems and in particular to managing memory access in data processing systems. Still more particularly, the present invention relates to a system, method and computer program product for preserving the ordering of read and write operations in a direct memory access system by delaying read access.

2. Description of the Related Art

A conventional symmetric multiprocessor (SMP) computer system, such as a server computer system, includes multiple processing units coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

One aspect of design that affects cache performance and design complexity is the handling of writes initiated by the processor or by an alternate bus master. Because two copies of a particular piece of data or instruction code can exist, one in system memory and a duplicate copy in the cache, writes to either the system memory or the cache memory can result in an inconsistency between the contents of the two storage units. For example, consider the case in which the same data in both the cache memory and the system memory in association with a particular address. If the processor subsequently initiates a write cycle to store a new data item at the predetermined address, a cache write "hit" occurs and the processor proceeds to write the new data into the cache memory. Since the data is modified in the cache memory but not in the system memory, the cache memory and system memory become inconsistent. Similarly, in systems with an alternate bus master, direct memory access (DMA) write cycles to system memory by the alternate bus master modify data in system memory but not in the cache memory. Again, the data in the cache memory and system memory become inconsistent.

Inconsistency between data in the cache memory and data in system memory during processor writes can be prevented or handled by implementing one of several commonly employed techniques. In the first technique, a "write-through" cache guarantees consistency between the cache memory and system memory by writing the same data to both the cache memory and system memory. The contents of the cache memory and system memory are always identical, and so the two storage systems are always coherent. In a second technique, a "write back" cache handles processor writes by writing only to the cache memory and setting a "dirty" bit to indicate cache entries which have been altered by the processor. When "dirty" or altered cache entries are later replaced during a "cache replacement" cycle, the modified data is written back into system memory.

Inconsistency between data in the cache memory and corresponding data in system memory during a DMA write operation is handled somewhat differently. Depending upon the particular caching architecture employed, one of the variety of bus monitoring or "snooping" techniques may be used. One such technique involves the invalidation of cache entries which become "stale" or inconsistent with system memory after a DMA write to system memory occurs. Another technique involves the "write-back" to system memory of all dirty memory blocks within the cache memory prior to the actual writing of data by the alternate bus master. After the dirty memory blocks that are targeted by the DMA write is written back to the system memory, the memory blocks are invalidated in the cache, and the write by the alternate bus master may be performed.

As systems become larger and the latency required to resolve cache coherence increases, this latency can limit the bandwidth that a DMA device is able to achieve in the system. To sustain full DMA write throughput, the system must balance the amount of time to resolve cache coherence with the amount of data transferred per request. The traditional method of balancing time required to resolve cache coherence and the amount of data transferred per request is to design the system with a larger cache line size. Thus, with a larger cache line size, more data can be invalidated per cache line invalidation request. However, the major drawbacks of increasing the cache line size include trailing edge effects and the increased likelihood of false sharing of data within the larger cache lines.

Therefore, there is a need for an improved system and method of increasing the throughput capacity of DMA devices without increasing the size of the cache line within the cache memory.

SUMMARY OF THE INVENTION

A method, system and computer program product for handling write requests in a data processing system is disclosed. The method comprises receiving on an interconnect bus a first write request targeted to a first address and receiving on the interconnect bus a subsequent second write request targeted to a subsequent second address. The subsequent second write request is completed prior to completing the first write request, and, responsive to receiving a read request targeting the second address before the first write request has completed, data associated with the second address of the second write request is supplied only after the first write request completes.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

In the present invention, DMA write requests are sent to interconnect logic upon receipt from the I/O controller or interconnect logic. If an older DMA write request receives retry response while a newer DMA write is in flight, the newer DMA write is allowed to complete, but the I/O controller issues a retry response to any subsequent read of the newer DMA write data until all older DMA writes have completed.

Figure 1:
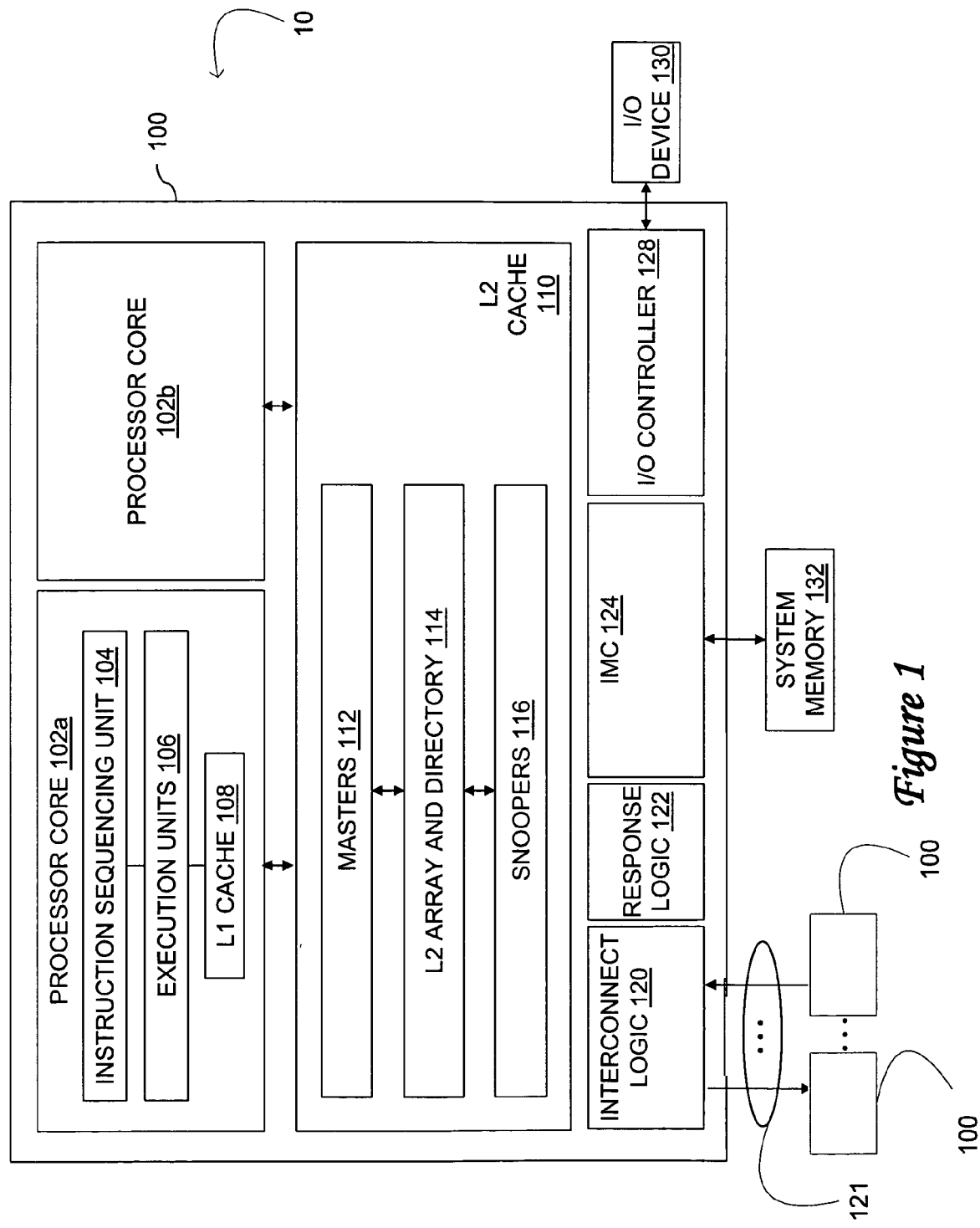
FIG. 1 illustrates a high level block diagram of a processing unit in accordance with the present invention.

With reference now to the figures and, in particular, with reference to FIG. 1, there is illustrated a high level block diagram of an exemplary embodiment of a data processing system 10 containing a plurality of processing units 100 in accordance with the present invention. In the depicted embodiment, processing unit 100 is a single integrated circuit including two processor cores 102a, 102b for independently processing instructions and data. Each processor core 102 includes at least an instruction sequencing unit (ISU) 104 for fetching and ordering instructions for execution and one or more execution units 106 for executing instructions. The instructions executed by execution units 106 may include, for example, fixed and floating point arithmetic instructions, logical instructions, and instructions that request read and write access to a memory block.

The operation of each processor core 102a, 102b is supported by a multi-level volatile memory hierarchy having at its lowest level one or more shared system memories 132 (only one of which is shown in FIG. 1) and, at its upper levels, one or more levels of cache memory. As depicted, processing unit 100 includes an integrated memory controller (IMC) 124 that controls read and write access to a system memory 132 in response to requests received from processor cores 102a, 102b and operations snooped on an interconnect fabric.

In the illustrative embodiment, the cache memory hierarchy of processing unit 100 includes a store-through level one (L1) cache 108 within each processor core 102a, 102b and a level two (L2) cache 110 shared by all processor cores 102a, 102b of the processing unit 100. L2 cache 110 includes an L2 array and directory 114, masters 112 and snoopers 116. Masters 112 initiate transactions on the interconnect fabric and access L2 array and directory 114 in response to memory access (and other) requests received from the associated processor cores 102a, 102b. Snoopers 116 detect operations on the interconnect fabric, provide appropriate responses, and perform any accesses to L2 array and directory 114 required by the operations. Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache.

As further shown in FIG. 1, processing unit 100 includes integrated interconnect logic 120 by which processing unit 100 may be coupled to the interconnect fabric as part of a larger data processing system. In the depicted embodiment, interconnect logic 120 supports an arbitrary number N of interconnect links 121, which include in-bound and out-bound links. With these interconnect links 121, each processing unit 100 may be coupled for bi-directional communication to up to N/2+1 other processing units 100.

Each processing unit 100 further includes an instance of response logic 122, which implements a portion of a distributed coherency signaling mechanism that maintains cache coherency between the cache hierarchy of processing unit 100 and those of other processing units 100. Finally, each processing unit 100 includes an integrated I/O (input/output) controller 128 supporting the attachment of one or more I/O devices, such as I/O device 130. I/O controller 128 may issue I/O read and I/O write operations and transmit data to and receive data from the local IMC 124 and interconnect links 121 in response to requests by I/O device 130.

Figure 2:
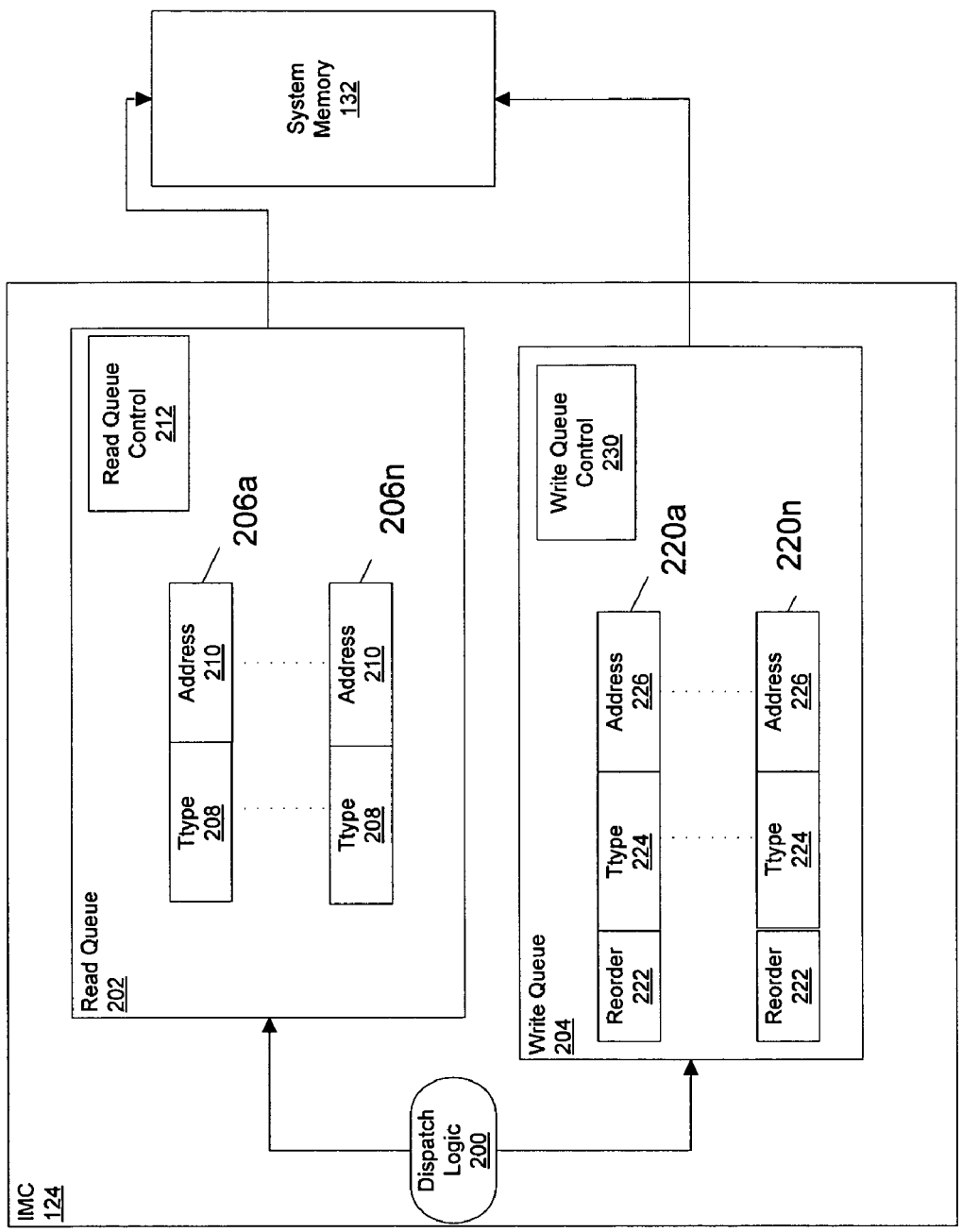
FIG. 2 depicts a high level block diagram of a memory controller in accordance with the present invention.

Turning now to FIG. 2, a high-level block diagram of a memory controller in accordance with the present invention is depicted. Integrated memory controller 124 contains dispatch logic 200 for routing incoming read and writes requests to a read queue 202 and a write queue 204, respectively. Read queue 202 holds read requests before servicing by reference to them to system memory 132. Read queue 202 contains several entries 206a–206n, each of which has a Ttype 208 and an address 210, regulated by a read queue control 212.

Similarly, write queue 204 holds write requests before servicing by reference to them to system memory 132. Write queue 204 contains several entries 220a–220n, each of which has a reorder bit 222, a Ttype 224 and an address 226, regulated by a write queue control 230. As will be explained below with respect to FIGS. 3–5, IMC 124 allows multiple DMA writes from a single I/O device 130 to remain ordered as observed by any potential consumer of data within data processing system 10 by reordering writes 220a–220n through adjustment of reorder bit 222 and control of read queue 202.

Figure 3:
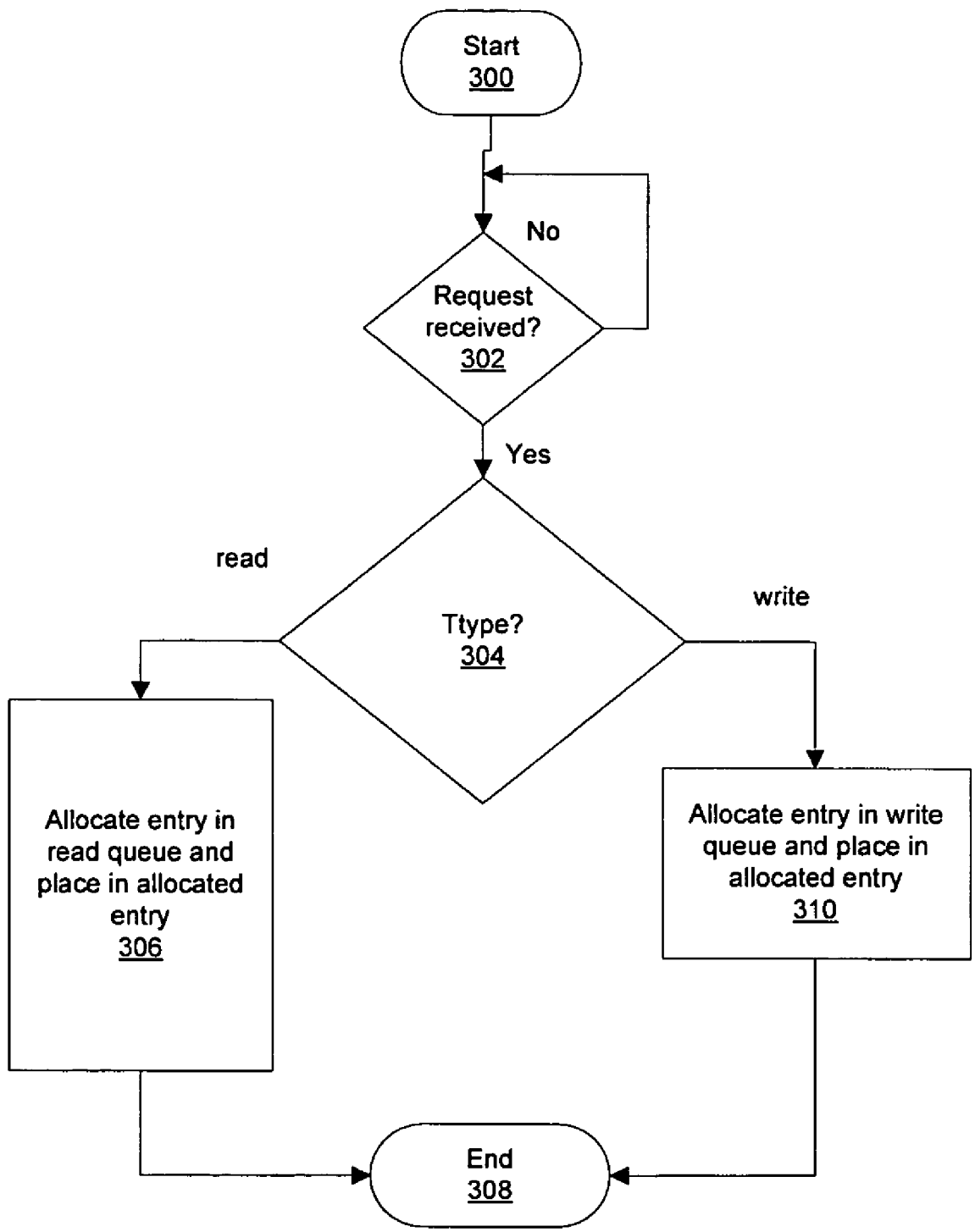
FIG. 3 is a high level logical flowchart of a process for assigning instructions to an appropriate queue in accordance with the present invention.

Referring now to FIG. 3, a high-level logical flowchart of a process by which IMC 124 assigns read and write requests to an appropriate queue in accordance with the present invention is illustrated. The process starts at step 300 and then moves to step 302, which depicts dispatch logic 200 of integrated memory controller 124 determining whether or not a read-type request has been received. If not, then the process iterates at step 302. If a request is received at step 302, then the process next proceeds to step 304. At step 304, dispatch logic 200 of integrated memory controller 124 determines the Ttype (transaction type) of the request received in step 302. If the request is a read-type request, the process next moves to step 306, which depicts dispatch logic 200 of integrated memory controller 124 allocating an entry in read queue 202 to the read-type request received in step 302 and placing the read-type request in the allocated entry in read queue 202. The process then ends at step 308.

Returning to step 304, if dispatch logic 200 of integrated memory controller 124 determines that the Ttype of the request received in step 302 is a write-type request, then the process next moves to step 310. At step 310, dispatch logic 200 of integrated memory controller 124 allocates an entry in write queue 204 to the request received in step 302 and places the write-type request in the allocated entry in write queue 204. The process then ends at step 308.

Figure 4:
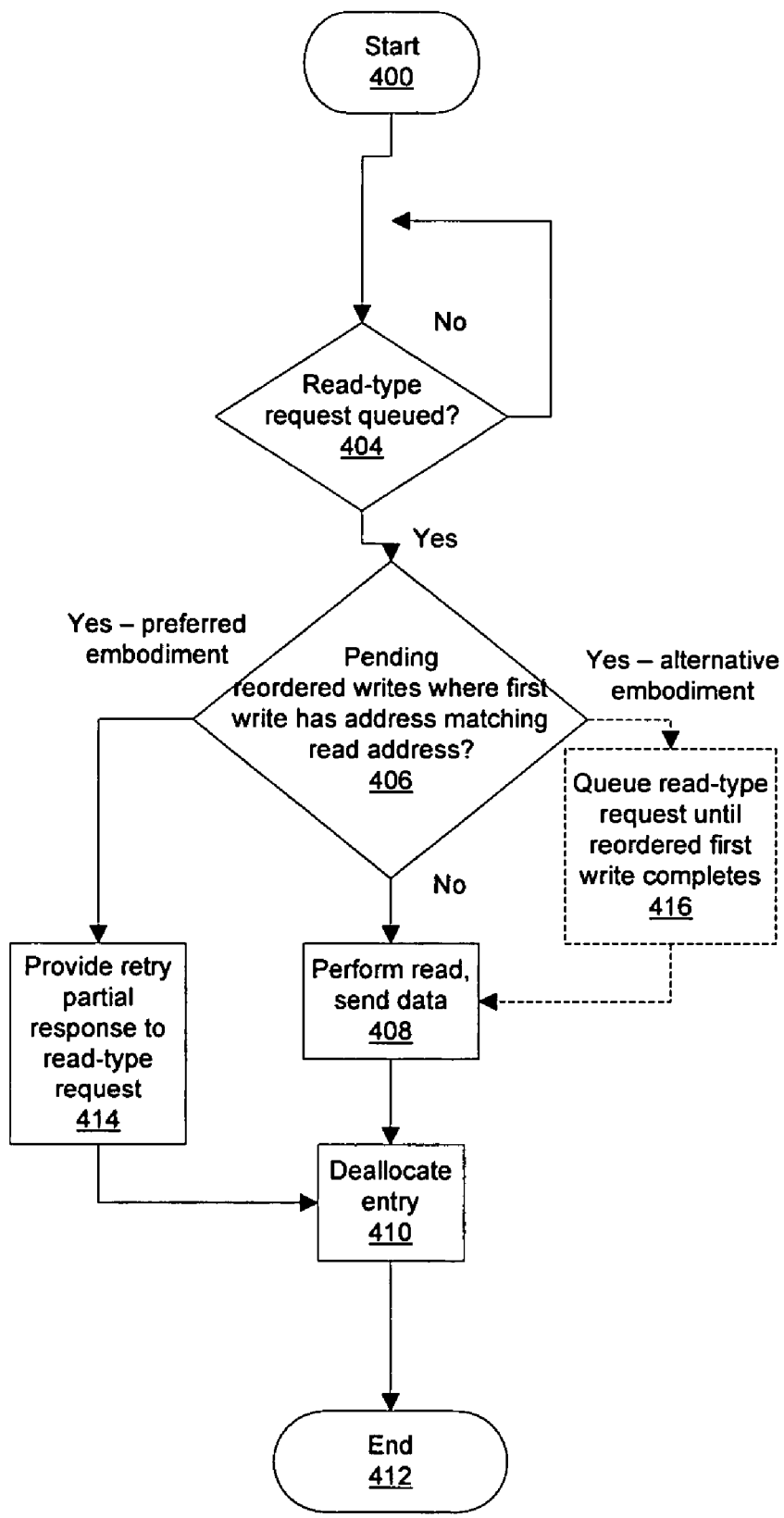
FIG. 4 is a high-level logical flowchart of a process for queuing read requests and performing read operations in accordance with a preferred embodiment of the present invention.

Turning now to FIG. 4, a high-level logical flowchart of a process by which read queue 202 services a read-type request in accordance with the preferred embodiment of the present invention is depicted. The process starts at step 400 and then moves to step 404, which depicts read queue controller 212 determining whether a read-type request has been received from dispatch logic 200. If no read-type request has been received, then the process iterates to step 404.

If read queue controller 212 determines that a read-type request has been received in one of the entries 206 of read queue 202, then the process next moves to step 406, which depicts read queue controller 212 determining whether any pending re-ordered write request exists within write queue 204 having a matching request address. In one preferred embodiment, read controller 212 queue makes this determination by reference to comparing address field 210 of the read request with the address fields 226 of the pending write requests and by checking the reorder flag 222 of any matching entry. In a preferred embodiment, if no address match is found for a re-ordered write request, then the process proceeds to step 408. At step 408, read queue controller 212 performs the requested read-type operation and routes the requested data to the appropriate destination. Thereafter, at block 410, read queue controller 212 de-allocates the entry in read queue 202 allocated to the read-type request. The process then ends at step 412.

Returning to step 406, if read queue controller 212 determines that any pending re-ordered write request exists within write queue 204 having a matching request address, the process will next proceed to step 414. At step 414, integrated memory controller 124 will provide a retry partial response to the sender of the read request, which can be any consumer of data on data processing system 10.

In an alternative embodiment, at step 406, if read queue controller 212 determines that any pending re-ordered write request exists within write queue 204 having a matching request address, then the process will proceed to step 416. At step 416, will allow read queue control 212 on integrated memory controller 124 will queue and hold the read-type request until any pending re-ordered write request that exists within write queue 204 having a matching request address completes. The process then moves to step 408, which is described above. As will be apparent to those skilled in the art, source queuing is generally preferred in a memory system. However, those skilled in the art will realize that some specialized applications may require destination queuing, such as is indicated with respect to step 416. Destination queuing, such as is indicated with respect to step 416, lies within the scope and spirit of the present invention.

Figure 5:
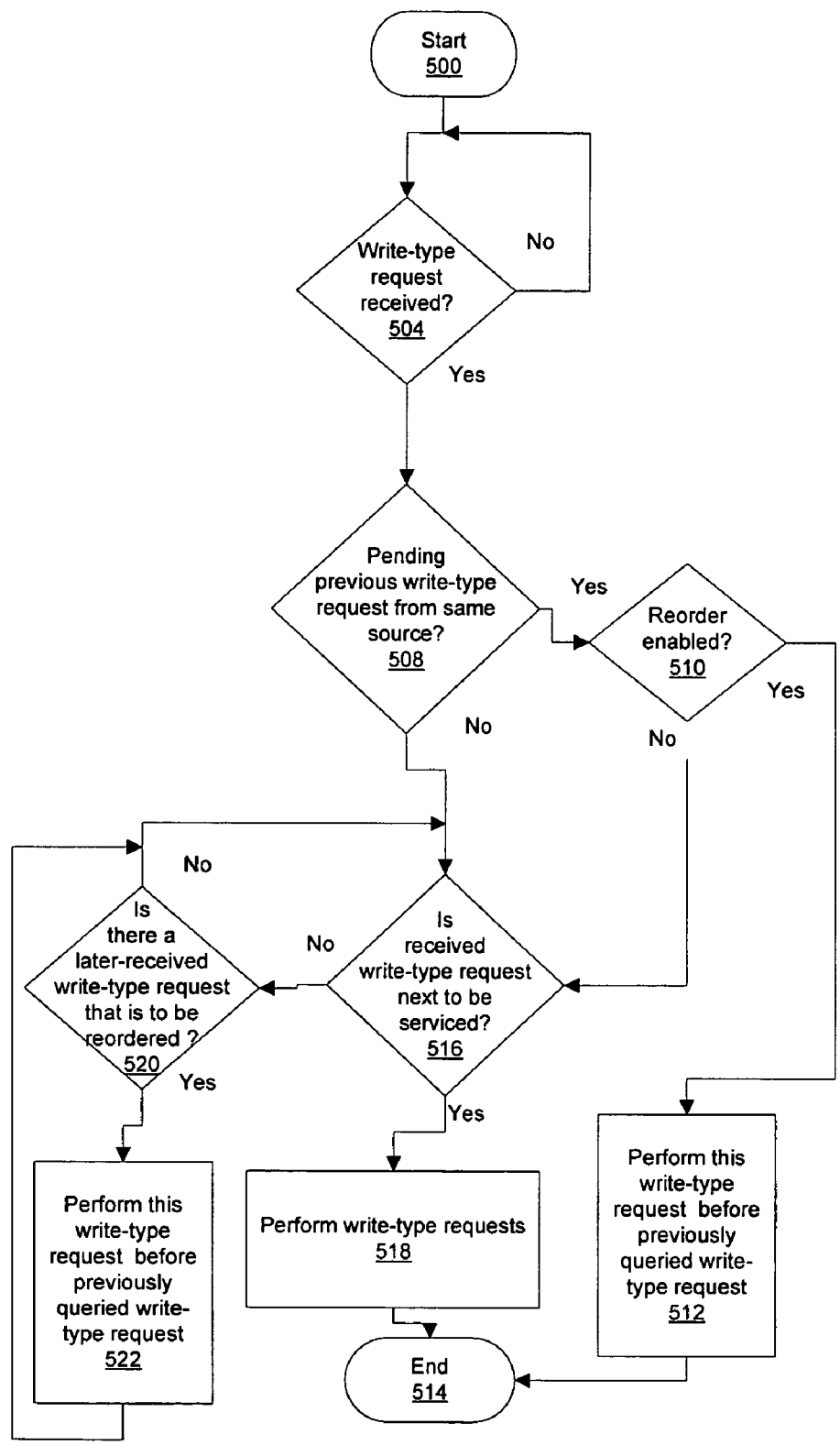
FIG. 5 is a high-level logical flowchart of a process for queuing write requests and performing write operations in accordance with a preferred embodiment of the present invention.

Turning now to FIG. 5, a high-level logical flowchart of a process by which write queue 204 services a write-type request in accordance with the preferred embodiment of the present invention is depicted. The process starts at step 500 and moves to step 504. At step 504, write queue controller 230 determines whether a write-type request has been received from dispatch logic 200. If no write request is received at dispatch logic 200, then the process iterates to step 504.

If write queue controller 230 determines that a write-type request has been received from dispatch logic 200, then the process next moves to step 508, which depicts write queue controller 230 determining whether any pending re-ordered write-type request exists within write queue 204 having a matching request address. If write queue controller 230 determines that any pending re-ordered write-type request exists within write queue 204 having a matching request address, then the process next proceeds to step 510.

At step 510, write queue controller 230 on integrated memory controller 124 determines whether re-ordering is enabled by inspecting reorder bit 222. If write queue controller 230 on integrated memory controller 124 determines that reorder bit 222 indicates re-ordering is enabled, then the process next moves to step 512, which depicts write queue controller 230 on integrated memory controller 124 performing a second subsequent received write request before a first received write request. The process then ends at step 514.

Returning to step 508, if write queue controller 230 determines that no pending re-ordered write-type request exists within write queue 204 having a matching request address, then the process next proceeds to step 516, which depicts write queue controller 230 determining whether the received write request is the next write-type request to be serviced. Those skilled in the art will realize that while a first-in first-out buffering and queuing system will be common in the art, alternative queuing mechanisms can be used to determine priority of fulfillment of write requests without departing from the spirit and scope of the present invention. If the write request received at step 504 is determined by write queue controller 230 to be the next to be serviced, then the process moves to step 518, which depicts integrated memory controller 124 performing the write-type request. The process then ends at step 514.

Returning to step 516, if write queue controller 230 determines that the write request received at step 504 is not the next to be serviced, then the process next moves to step 520, which depicts write queue controller 230 determining by inspecting reorder bit 222 of each entry 220a–220n whether there is a later-received write-type request that is to be re-ordered. If write queue controller 230 determines that there is no later write request to be re-ordered, then the process returns to step 516. If write queue controller 230 determines that there is a later write request to be re-ordered, then the process proceeds to step 522, which depicts write queue controller 230 on integrated memory controller 124 performing a second subsequent received write request before a first received write request. The process then returns to step 516, which is described above.

An example is provided below. While the example below is explained with respect to an environment with two write requests and one read request, those skilled in the art will quickly anticipate that the present invention applies equally to any set of multiple writes and multiple reads, and that the present invention is substantially scalable. The following example of system behavior illustrates the performance of a preferred embodiment:
1. DMA address A is broadcast by interconnect logic 120.
2. DMA address B is broadcast by interconnect logic 120.
3. DMA address A receives a response indicating that the operation must be retried.
4. DMA address B receives a response indicating that the operation is successful.
5. DMA address A is broadcast on interconnect logic 120.
6. DMA address A receives a response indicating that the operation is successful.

During the time required to complete step 5 and step 6, if any processor or other consumer of data attempts to read the data from DMA write to address B, I/O controller 128 issues a retry response to prevent the read from completing, thereby restricting read access. By allowing DMA writes to deliver data independently and enforcing coherency by restricting subsequent read access when required, the DMA write ordering rules are met without substantial negative impact to bandwidth and throughput.

While the present invention is explained with respect to an environment with two write requests and one read request, those skilled in the art will quickly anticipate that the invention applies equally to any set of multiple writes and multiple reads, and that the present invention is substantially scalable. Further, as used with respect to the present invention, the terms second and second subsequent refer to any subsequent write request without regard to how many intervening write requests have accumulated.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. A method of handling write requests in a data processing system, said method comprising:
   receiving on an interconnect a first write request targeting a first address;
   receiving on said interconnect a subsequent second write request targeting a subsequent second address;
   completing said subsequent second write request prior to completing said first write request; and
   responsive to receiving a read request targeting said second address before said first write request has completed, supplying data associated with said second address of said second write request only after said first write request completes.

2. The method of claim 1, further comprising issuing a partial fulfillment response with respect to said read request.

3. The method of claim 1, further comprising issuing a retry response with respect to said read request.

4. The method of claim 1, further comprising queuing read requests for delayed fulfillment.

5. The method of claim 3, wherein said step of issuing a retry response with respect to said read request further comprises issuing said retry response from a memory controller.

6. The method of claim 1, wherein said step of receiving on said interconnect a subsequent second write request targeting a subsequent second address further comprises receiving on said interconnect a subsequent second write request from a same source that has sent said first write request.

7. The method of claim 5, wherein said step of issuing said retry response from a memory controller further comprises restricting read access.

8. A memory controller for handling read requests and write requests in a data processing system, said memory controller comprising:
   write logic, responsive to receiving from an interconnect a first write request targeting a first address and a subsequent second write request targeting a subsequent second address that completes said subsequent second write request prior to completing said first write request; and
   read logic, responsive to receiving a read request targeting said second address before said first write request has completed, that supplies data associated with said second address of said second write request only after said first write request completes.

9. The memory controller of claim 8, further comprising signaling logic for issuing a partial fulfillment response with respect to said read request.

10. The memory controller of claim 8, wherein said read logic provides a retry response with respect to said read request.

11. The memory controller of claim 8, wherein said read logic queues read requests for delayed fulfillment.

12. The memory controller of claim 8, wherein said write logic further comprises write logic, responsive to receiving from an interconnect a first write request from a source targeting a first address and a subsequent second write request from said source targeting a subsequent second address that completes said subsequent second write request prior to completing said first write request.

13. The memory controller of claim 8, wherein said read logic further comprises read logic within a read queue controller.

14. A processing unit comprising, a memory unit, one or more processor cores and the memory controller of claim 8.

15. A data processing system, said system comprising:
   one or more processing cores;
   one or more units of memory; and
   a memory controller for handling read requests and write requests in a data processing system, said memory controller comprising:
      write logic, responsive to receiving from an interconnect a first write request targeting a first address and a subsequent second write request targeting a subsequent second address that completes said subsequent second write request prior to completing said first write request; and
      read logic, responsive to receiving a read request targeting said second address before said first write request has completed, that supplies data associated with said second address of said second write request only after said first write request completes.

16. The data processing system of claim 15, wherein said memory controller further comprises signaling logic for issuing a partial fulfillment response with respect to said read request.

17. The data processing system of claim 15, wherein said read logic provides a retry response with respect to said read request.

18. The data processing system of claim 15, wherein said read logic queues read requests for delayed fulfillment.

19. The data processing system of claim 15, wherein said write logic further comprises write logic, responsive to receiving from an interconnect a first write request from a source targeting a first address and a subsequent second write request from said source targeting a subsequent second address that completes said subsequent second write request prior to completing said first write request.

20. The data processing system of claim 15, wherein said read logic further comprises read logic within a read queue controller.

* * * * *